(12) United States Patent
Stough et al.

(10) Patent No.: US 12,473,891 B2
(45) Date of Patent: Nov. 18, 2025

(54) ROLL CONTROL FOR AIRBORNE WIND ENERGY SYSTEM

(71) Applicant: Windlift, Inc, Durham, NC (US)

(72) Inventors: Andy Stough, Durham, NC (US); Mark Aull, Durham, NC (US); Bryce Phillips, Durham, NC (US); Chris Gibson, Durham, NC (US)

(73) Assignee: Windlift, Inc., Durham, NC (US)

( * ) Notice: Subject to any disclaimer, the term of this patent is extended or adjusted under 35 U.S.C. 154(b) by 0 days.

(21) Appl. No.: 18/862,942

(22) PCT Filed: May 4, 2023

(86) PCT No.: PCT/US2023/021089
§ 371 (c)(1),
(2) Date: Nov. 4, 2024

(87) PCT Pub. No.: WO2023/215530
PCT Pub. Date: Nov. 9, 2023

(65) Prior Publication Data
US 2025/0290487 A1    Sep. 18, 2025

Related U.S. Application Data

(60) Provisional application No. 63/338,385, filed on May 4, 2022.

(51) Int. Cl.
*F03D 9/32* (2016.01)

(52) U.S. Cl.
CPC .................................. *F03D 9/322* (2023.08)

(58) Field of Classification Search
CPC ...................................................... F03D 9/322
See application file for complete search history.

(56) References Cited

U.S. PATENT DOCUMENTS

| | | |
|---|---|---|
| 2,561,371 A | 7/1951 | James |
| 4,842,221 A | 6/1989 | Beach |
| 5,390,618 A | 2/1995 | Wolff |
| 7,582,981 B1 | 9/2009 | Meller |
| 7,656,053 B2 | 2/2010 | Griffith |
| 7,847,426 B1 | 12/2010 | Griffith |
| 8,350,403 B2 | 1/2013 | Carroll |
| 8,421,257 B2 | 4/2013 | Chernyshov |
| 9,056,677 B1 | 6/2015 | Jensen |

(Continued)

FOREIGN PATENT DOCUMENTS

| | | |
|---|---|---|
| EP | 3839248 A1 | 6/2021 |
| WO | 2019070735 A2 | 4/2019 |

OTHER PUBLICATIONS

International Search Report/Written Opinion Issued in PCT/US2024/034215 Nov. 20, 2024.

*Primary Examiner* — Viet P Nguyen
(74) *Attorney, Agent, or Firm* — Brennan, Manna & Diamond, LLC; Matthew J. Schonauer

(57) ABSTRACT

A bridle system and roll control sheave for quickly and accurately directing the roll of an airborne wing in an airborne wind energy system is disclosed. A pair of medial bridle segments are connected to a sheave which is placed within the fuselage. A roll control motor is preferably connected to the sheave and is controlled by an electronic controller to rotate and change the relative lengths of the medial bridle segments.

19 Claims, 9 Drawing Sheets

(56) References Cited

U.S. PATENT DOCUMENTS

| | | |
|---|---|---|
| 9,156,565 B2 | 10/2015 | Hachtmann |
| 9,212,033 B2 | 12/2015 | Vander Lind |
| 9,239,041 B2 | 1/2016 | Goldstein |
| 9,248,910 B1 | 2/2016 | Vander Lind |
| 9,308,975 B2 | 4/2016 | Vander Lind |
| 9,327,845 B2 | 5/2016 | Vander Lind |
| 9,329,096 B1 | 5/2016 | Jensen |
| 9,352,832 B2 | 5/2016 | Vander Lind |
| 9,458,829 B2 | 10/2016 | Hallamasek |
| 9,604,733 B2 | 3/2017 | Hachtmann |
| 9,650,136 B1 | 5/2017 | Haskin |
| 9,664,175 B2 | 5/2017 | Vander Lind |
| 9,676,496 B2 | 6/2017 | Hachtmann |
| 9,705,302 B1 | 7/2017 | Patten |
| 9,709,026 B2 | 7/2017 | Vander Lind |
| 9,732,731 B2 | 8/2017 | Hachtmann |
| 9,764,820 B2 | 9/2017 | Kinne |
| 9,771,925 B2 | 9/2017 | Gilroysmith |
| 9,784,243 B2 | 10/2017 | Vander Lind |
| 9,835,139 B2 | 12/2017 | Vander Lind |
| 9,884,692 B2 | 2/2018 | Patten |
| 10,280,034 B2 | 5/2019 | Belani |
| 10,301,143 B2 | 5/2019 | Belani |
| 10,309,374 B2 | 6/2019 | Nelson |
| 10,310,516 B2 | 6/2019 | Nordstrom |
| 10,442,524 B1 | 10/2019 | Treat |
| 10,465,657 B2 | 11/2019 | Nordstrom |
| 10,479,482 B1 | 11/2019 | Kuentzel |
| 10,518,876 B2 | 12/2019 | Hachtmann |
| 10,590,911 B2 | 3/2020 | Aull |
| 10,899,422 B2 | 1/2021 | Schmidt |
| 11,117,659 B2 | 9/2021 | Stough |
| 11,236,728 B2 | 2/2022 | Creighton |
| 12,012,925 B2 | 6/2024 | Creighton |
| 2008/0048453 A1 | 2/2008 | Amick |
| 2008/0240864 A1 | 10/2008 | Belinsky |
| 2009/0072092 A1 | 3/2009 | Griffith |
| 2010/0032948 A1 | 2/2010 | Bevirt |
| 2010/0032949 A1 | 2/2010 | Varrichio |
| 2010/0213718 A1 | 8/2010 | Kelly |
| 2010/0295303 A1 | 11/2010 | Lind |
| 2011/0121570 A1 | 5/2011 | Bevirt |
| 2011/0148115 A1 | 6/2011 | Roznitsky |
| 2011/0260462 A1 | 10/2011 | Vander Lind |
| 2011/0266395 A1 | 11/2011 | Bevirt |
| 2012/0104763 A1 | 5/2012 | Lind |
| 2012/0279557 A1 | 11/2012 | Alwitt |
| 2013/0221679 A1 | 8/2013 | Vander Lind |
| 2014/0219799 A1 | 8/2014 | Selsam |
| 2015/0183510 A1 | 7/2015 | Vander Lind |
| 2015/0183516 A1 | 7/2015 | Vander Lind |
| 2015/0225043 A1 | 8/2015 | Gu |
| 2015/0225080 A1 | 8/2015 | Bormann |
| 2015/0232200 A1 | 8/2015 | Vander Lind |
| 2015/0251763 A1 | 9/2015 | Vander Lind |
| 2015/0308410 A1 | 10/2015 | Goldstein |
| 2015/0330368 A1 | 11/2015 | Goldstein |
| 2016/0002013 A1 | 1/2016 | Hachtmann |
| 2017/0121036 A1 | 5/2017 | Hachtmann |
| 2017/0190418 A1 | 7/2017 | Patten |
| 2017/0363070 A1 | 12/2017 | Hart |
| 2018/0094619 A1 | 4/2018 | Sellers |
| 2018/0134357 A1 | 5/2018 | Vestel |
| 2018/0149137 A1 | 5/2018 | Nordstrom |
| 2018/0170491 A1 | 6/2018 | Nordstrom |
| 2018/0170537 A1 | 6/2018 | Hachtmann |
| 2018/0292843 A1 | 10/2018 | Nordstrom |
| 2019/0031340 A1 | 1/2019 | Patten |
| 2019/0063398 A1 | 2/2019 | Quappen |
| 2019/0103202 A1 | 4/2019 | Patten |
| 2019/0177006 A1 | 6/2019 | Quick |
| 2019/0178228 A1 | 6/2019 | Nordstrom |
| 2019/0338751 A1* | 11/2019 | Aull ................. B64C 31/06 |

* cited by examiner

ROLL CONTROL FOR AIRBORNE WIND ENERGY SYSTEM

CROSS-REFERENCE TO RELATED APPLICATIONS

This application is an international application under the Patent Cooperation Treaty and claims the benefit of priority to the national application earlier filed in the United States and identified as U.S. Provisional Application No. 63/338,385 filed 4 May 2023.

FEDERALLY SPONSORED RESEARCH

Research leading to various aspects of the present invention were sponsored, at least in part, by the Office of Naval Research and the Defense Contract Management Agency under contract number N0017320C2026. The United States Government may have certain rights in the invention.

TECHNICAL FIELD

Embodiments generally relate to roll control assemblies for airborne wind energy systems.

BACKGROUND OF THE INVENTION

Airborne Wind Energy (AWE) involves harvesting wind energy to produce electricity, many embodiments of which use airborne wing designs. The generation of electricity using airborne wings is strongly dependent on the trajectory of the flight vehicle.

When the wing is in a power generation cycle, the roll angle relative to the main tether varies continuously throughout the cycle and with changing wind conditions. This rolling orients the lift force of the wing to balance other forces on the vehicle and generate required centripetal accelerations for turning.

BRIEF SUMMARY OF THE INVENTION

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

Exemplary embodiments provide a bridle system and roll control sheave for quickly and accurately directing the roll of an airborne wing in the AWE. A pair of medial bridle segments are connected to a sheave which is placed within the fuselage. A roll control motor is preferably connected to the sheave and is controlled by an electronic controller to rotate and change the relative lengths of the medial bridle segments.

The sheave preferably contains a pair of opposing grooves that are separated by a rim, with each medial bridle being attached within one of the grooves. A cover may be positioned above the sheave to ensure the proper bridle segments remain within the grooves even when the bridle segment is slack. Openings within the fuselage allow the medial bridle segments to pass through the fuselage and connect to the sheave.

An exemplary implementation of the disclosed invention is an airborne wind energy system connected to a power output that includes an airborne unit, an electrified tether and a bridle system. The airborne unit in some embodiments includes a wing bearing at least one rotor motor configured to generate electrical power and having a left end and a right end, a fuselage attached to the wing between the left and right ends of the wing, a roll control motor secured within the fuselage, and a roll control sheave connected to and rotatably driven by the roll control motor. The electrified tether electrically connects the airborne unit with the power output, and the bridle system has a first medial segment and a second medial segment connected to the roll control sheave wherein the rotation of the roll control sheave lengthens one of the first and second medial segments and shortens the other, thereby inducing the airborne unit to roll.

In some embodiments, the bridle system is provided with a left lateral segment with a distal end and a proximal end fixed to the wing between the left end of the wing and the fuselage, a right lateral segment with a distal end and a proximal end fixed to the wing between the right end of the wing and the fuselage, a left medial segment with a proximal end fixed to the roll control sheave and a distal end fixed to the distal end of the left lateral segment, a right medial segment with a proximal end fixed to the roll control sheave and a distal end fixed to the distal end of the right lateral segment, a lower left segment with a proximal end fixed to a tether connection and a distal end fixed to the distal end of the left lateral segment and the distal end of the left medial segment, and a lower right segment with a proximal end fixed to the tether connection and distal end fixed to the distal end of the right lateral segment and the distal end of the right medial segment.

In other implementations, the bridle system includes a first continuous segment connected at a proximal end to the roll control sheave and a distal end fixed to the wing between the left end of the wing and the fuselage, a lower left segment with a proximal end fixed to a tether connection and a distal end fixed to the first continuous segment between the proximal and distal ends, a second continuous segment connected at a proximal end to the roll control sheave and a distal end fixed to the wing between the right end of the wing and the fuselage, and a lower right segment with a proximal end fixed to the tether connection and distal end fixed to the second continuous segment between the proximal and distal ends.

Other implementations include a bridle system having a continuous segment having a first end fixed to the roll control sheave, a second end fixed to the roll control sheave, and a tether attachment point between the first and second ends. They may also include a left lateral segment with a proximal end fixed to the wing between the left end of the wing and the fuselage and a distal end movably attached to the continuous segment with a first pulley between the first end and the tether attachment point, and a right lateral segment with a proximal end fixed to the wing between the right end of the wing and the fuselage and a distal end movably attached to the continuous segment with a second pulley between the second end and the tether attachment point.

Some of those embodiments include a bridle system having a left lateral support segment with a proximal end fixed to the wing between the left end of the wing and the fuselage and a distal end connected to the second pulley, and a right lateral support segment with a proximal end fixed to the wing between the right end of the wing and the fuselage and a distal end connected to the first pulley.

Further still, similar implementations may include a bridle system with a third pulley located at the tether attachment point, a left medial support segment with a proximal end fixed to the wing near the fuselage and a distal end fixed to the first pulley, a right medial support segment with a proximal end fixed to the wing near the fuselage and a distal end fixed to the second pulley, and a lower support segment fixed at a first end to the left lateral segment and at a second end to the right lateral segment and is carried on the third pulley therebetween.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Figure 1:
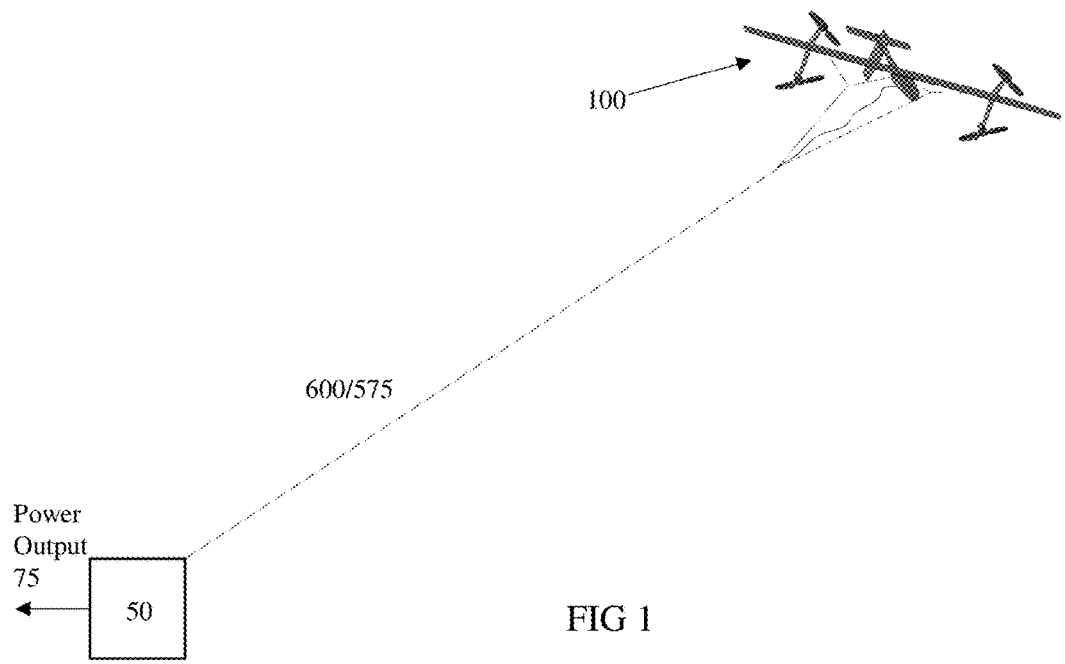
FIG. 1 is a perspective view of an exemplary embodiment of an AWE system with an exemplary airborne unit in flight.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. Similarly, the use of the word "or" is intended to be non-exclusive unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of an exemplary embodiment of an AWE system with an exemplary airborne unit 100 in flight. The base unit 50 is positioned either on the ground or anchored above a sea bed, and is connected to the airborne unit 100 using an electrified tether 600 and sometimes including an additional strength tether or support tether 575 for added tension strength (in some embodiments, only an electrified tether 600 may be necessary). Power generated by the airborne unit 100 is transferred via the electrified tether 575 to the base unit 50 where it is then output (after some possible power conditioning and/or cleaning) to a power output 75 which could be any one of the following: a battery, an electrical grid, a power substation, or mechanical energy storage.

Figure 2:
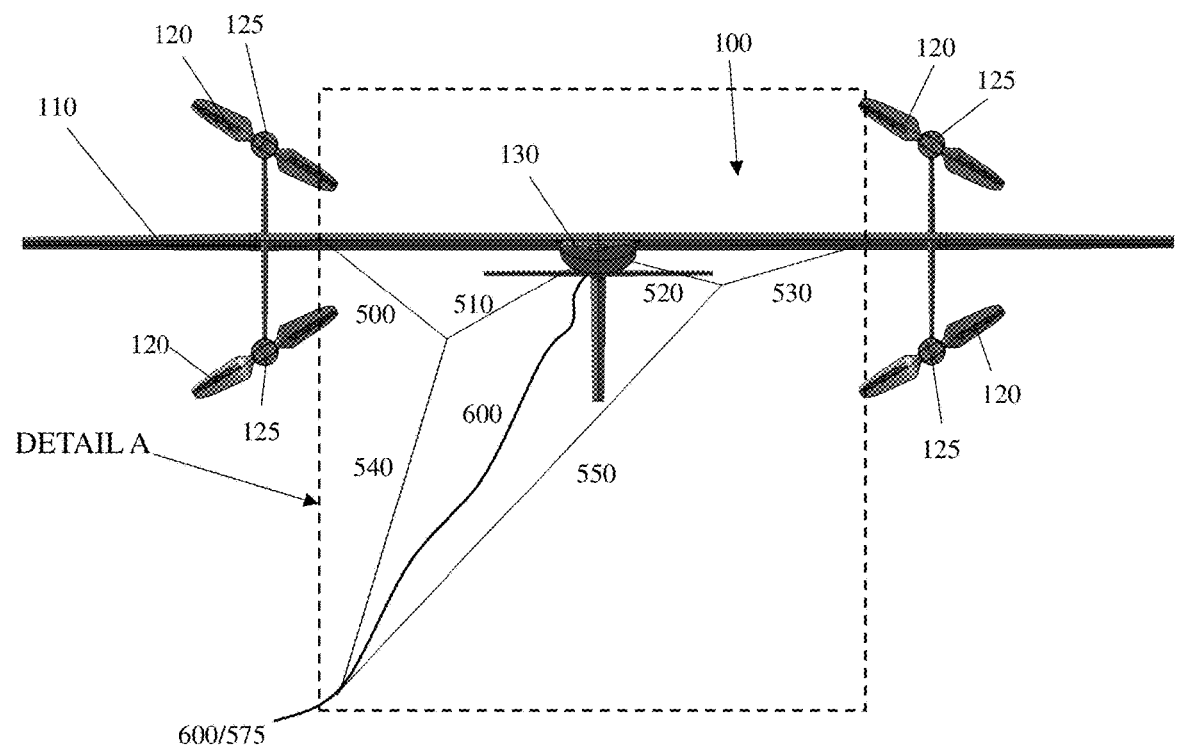
FIG. 2 is a front projection view of the airborne unit and bridle configuration shown in FIG. 1 and indicating the location of DETAIL A.

FIG. 2 is a front projection view of the airborne unit 100 and bridle configuration shown in FIG. 1 and indicating the location of DETAIL A. The airborne unit 100 preferably includes a wing 110 having left and right ends with a plurality of rotors 120 extending from the wing 110. Each rotor 120 is connected to a rotor motor 125, which is used in one of two general modes: (1) to fly the airborne unit when raising/lowering the unit into proper position and (2) generation of power based on the current wind speed and apparent wind from the turning velocity of the wing 110. A fuselage 130 is positioned in the center of the wing 110 and contains some interior components that will be described below.

The bridle configuration includes a combination of six different bridle segments: upper left lateral 500, upper left medial 510, upper right medial 520, upper right lateral 530, lower left 540, and lower right 550. The electrified tether 600 preferably exits the fuselage 130 and is provided with a sufficient slack and then combined with lower left 540 and lower right 550 segments before continuing down to the base unit 50.

Figure 3:
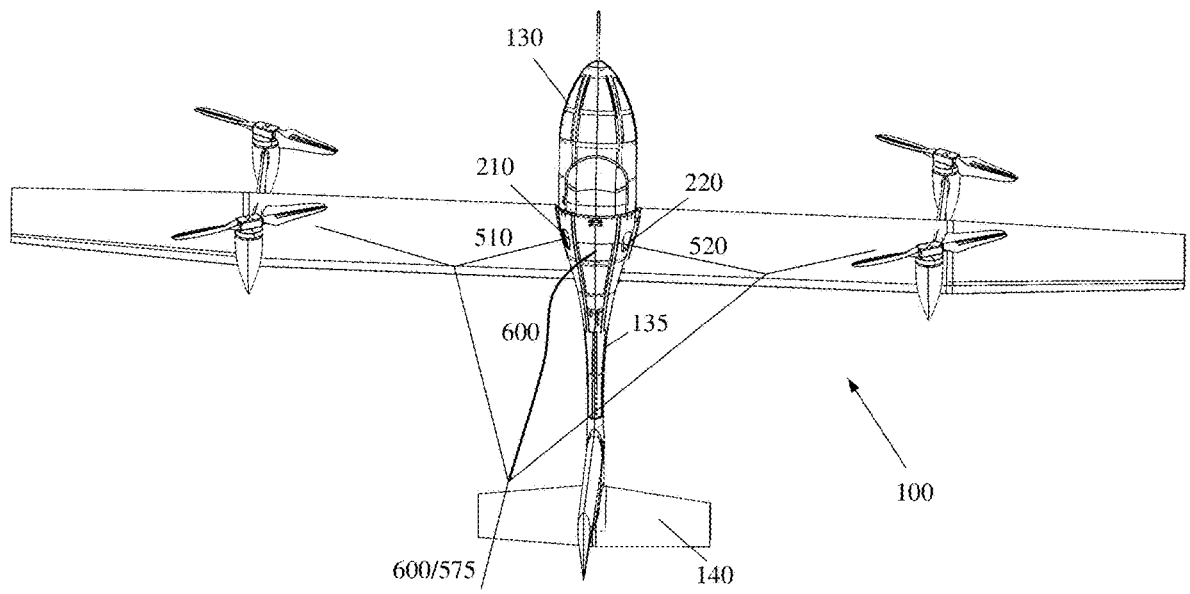
FIG. 3 is bottom perspective view of the airborne unit shown in FIGS. 1-2.

FIG. 3 is bottom perspective view of the airborne unit 100 shown in FIGS. 1-2. The nose of the fuselage 130 is preferably wide and flat, while continuing to the rear of the unit 100 the fuselage narrows to a very narrow center section 135 before continuing all the way to the rear of the unit 100 where the tail 140 is positioned. The underside of the fuselage 130 preferably contains a pair of openings 210 and 220 for accepting the left 510 and right 520 medial bridle segments, respectively.

Figure 4:
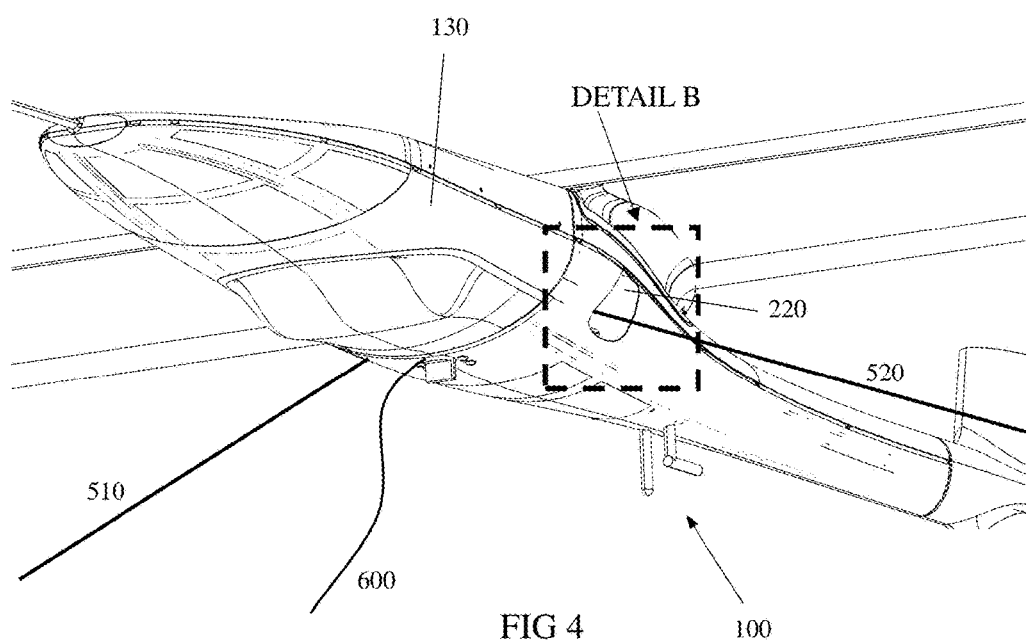
FIG. 4 is a partial perspective view of the airborne unit shown in FIGS. 1-3 and indicating the location of DETAIL B.
Figure 5:
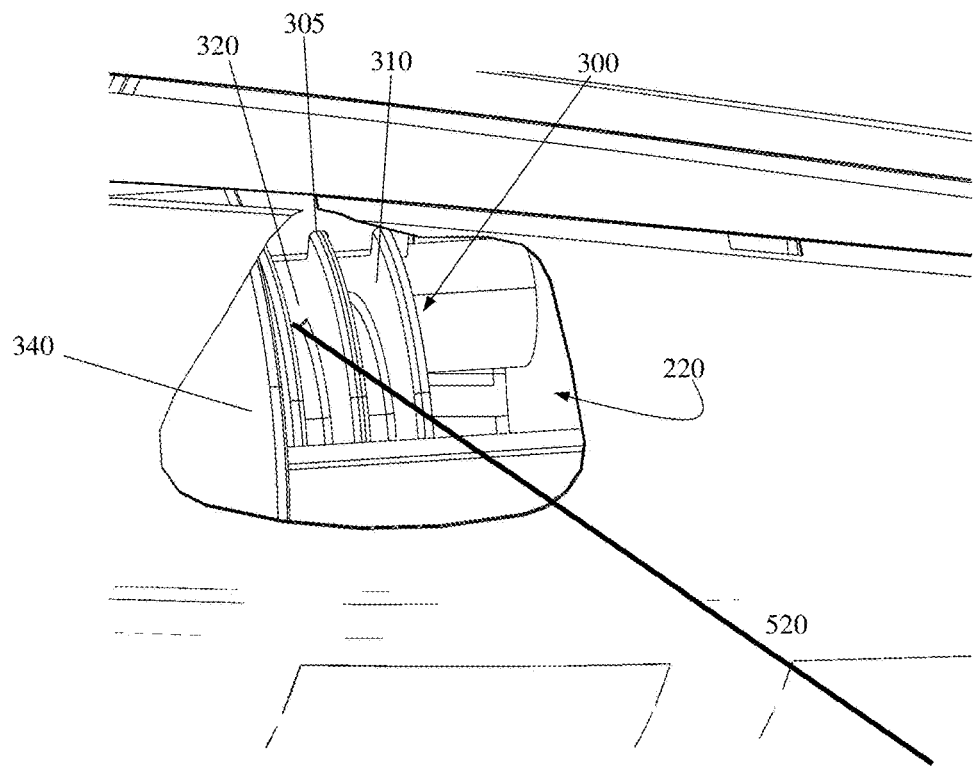
FIG. 5 is a detailed view of DETAIL B.

FIG. 4 is a partial perspective view of the airborne unit 100 shown in FIGS. 1-3 and indicating the location of DETAIL B. Right medial bridle segment 520 is shown entering the fuselage 130 through the opening 220. FIG. 5 is a detailed view of DETAIL B located in FIG. 4. Right medial bridle segment 520 is preferably connected to a groove selected from at least two sheave grooves, such as a forward groove 320 in the roll control sheave 300. The at least two sheave grooves are depicted as rear groove 320 and forward groove 320 in this exemplary embodiment, and are separated from one another by a rim 305. Also visible in this illustration is a portion of the roll control motor 340 that drives the rotation of the sheave 300.

Figure 6:
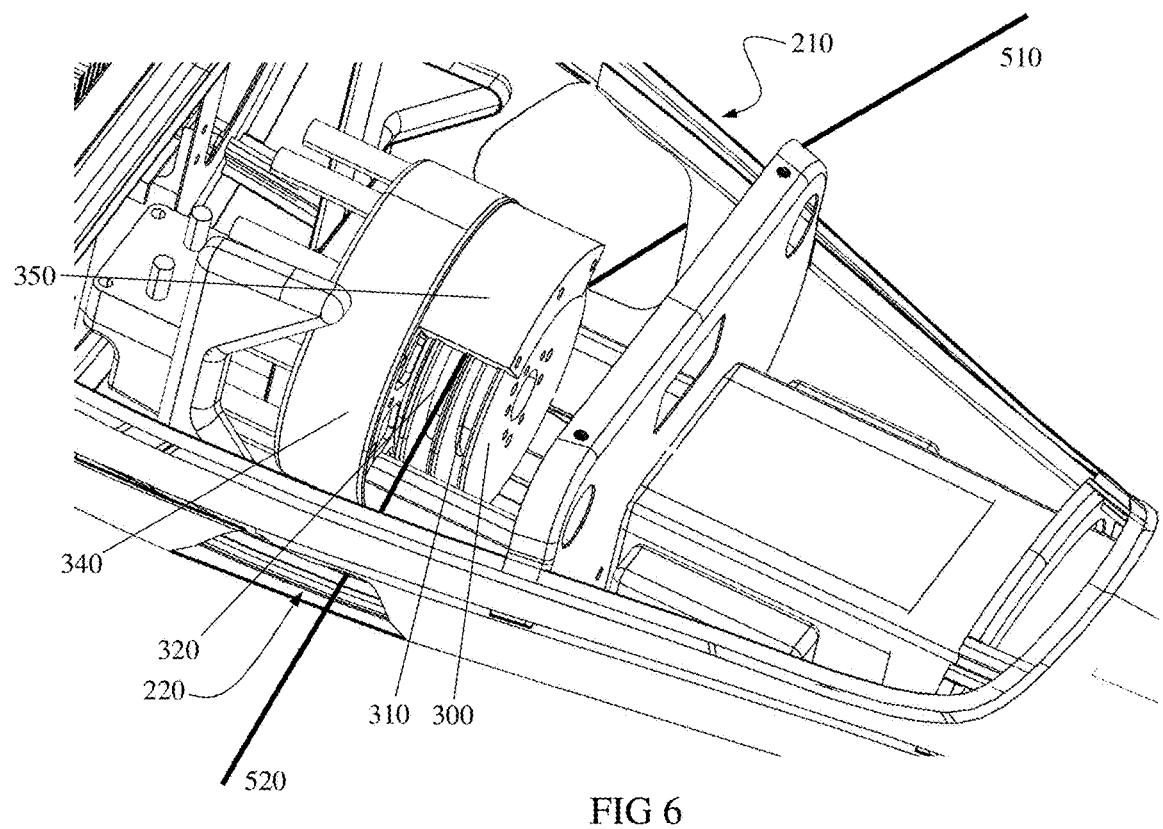
FIG. 6 is a top perspective view of a portion of the forward fuselage with the top cover removed to show one embodiment for arranging the interior components.

FIG. 6 is a top perspective view of the forward fuselage 130 with the top cover removed to show one embodiment for arranging the interior components. The left medial bridle segment 510 preferably passes through opening 210 and then attaches to another one of the at least two grooves, such as the rear groove 310 in the roll control sheave 300.

A roll control motor 340 is preferably connected to the sheave 300 to cause the sheave 300 to rotate back and forth, thereby adjusting the relative lengths of medial bridal segments 510 and 520 to cause the airborne unit 100 to roll. A cover 350 is preferably placed above the sheave 300 to help prevent the bridle segments 510 and 520 from wrapping around an unintended component and stay within their respective grooves 310 and 320.

Figure 7A:
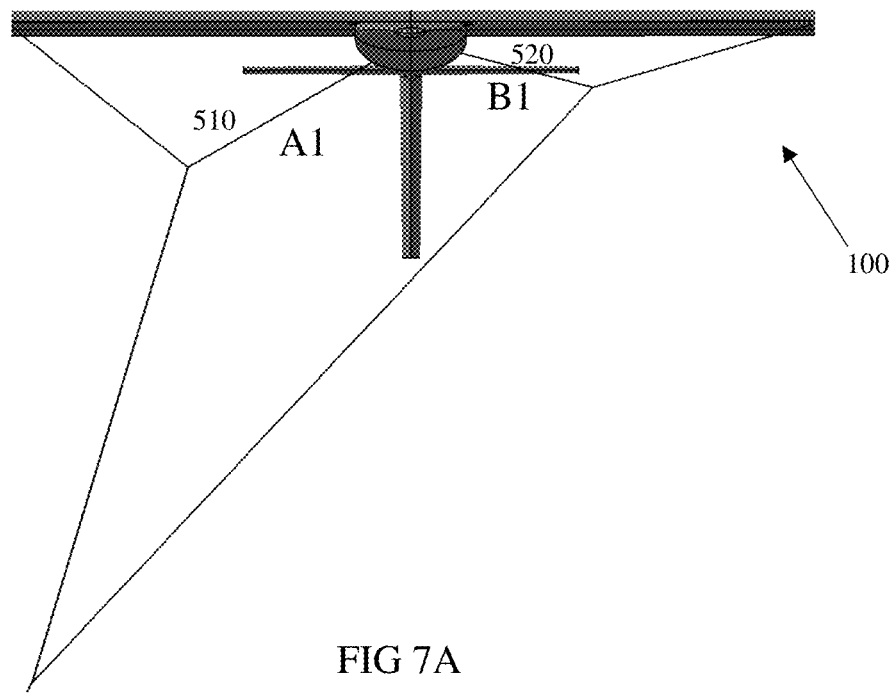
FIG. 7A is a detailed view of DETAIL A and illustrating a first roll scenario.

FIG. 7A is a detailed view of DETAIL A and illustrating a first roll scenario. Here, the roll control motor 340 has caused the sheave 300 to rotate such that medial segments 510 and 520 are no longer of similar length. Now, the length B1 of right medial segment 520 is less than the length A1 of left medial segment 510. This arrangement of unequal bridle lengths causes the wing 110 to roll to the left towards medial segment 510, the longer of the two medial segments in this scenario.

Figure 7B:
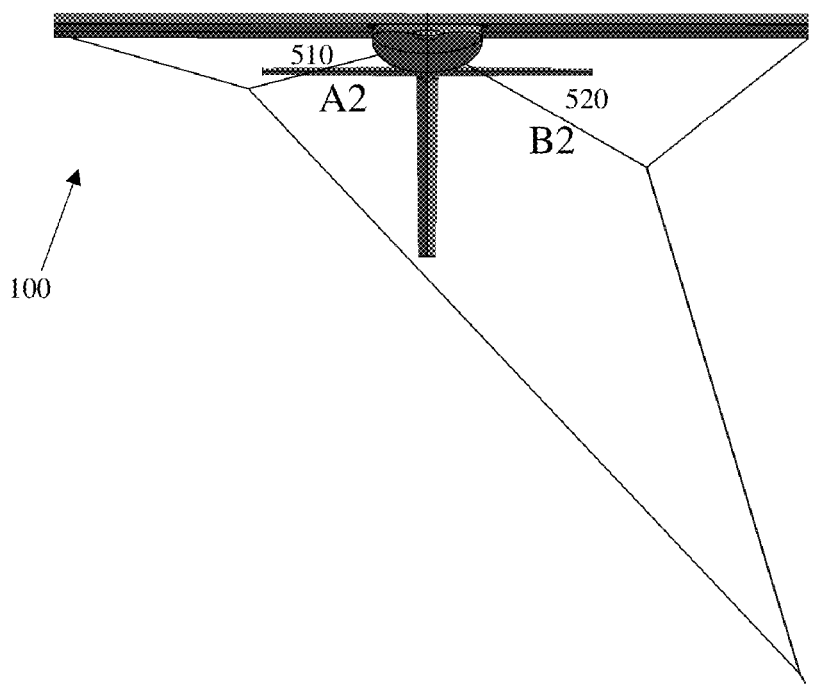
FIG. 7B is a detailed view of DETAIL A and illustrating a second roll scenario.

FIG. 7B is a detailed view of DETAIL A and illustrating a second roll scenario. Here, the roll control motor 340 has caused the sheave 300 to rotate such that the length B2 of right medial segment 520 is more than the length A2 of left medial segment 510. This arrangement of unequal bridle lengths causes the wing 110 to roll to the right towards medial segment 520, the longer of the two medial segments in this scenario.

Figure 8:
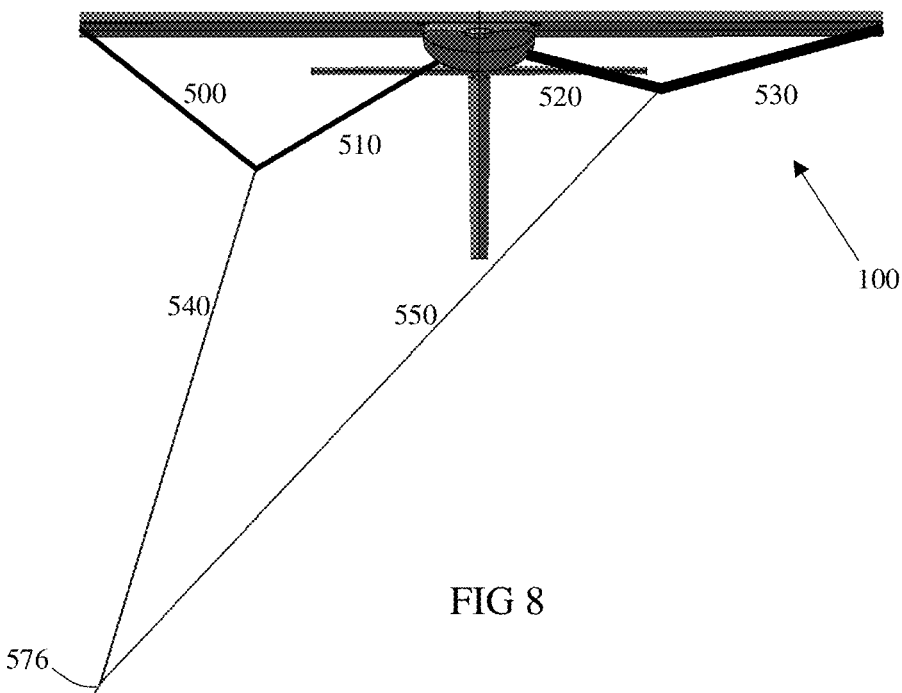
FIG. 8 is a detailed view of DETAIL A and illustrating one embodiment for arranging the bridle system.

FIG. 8 is a detailed view of DETAIL A and illustrating one embodiment for arranging the bridle system. In this embodiment, left lateral segment 500 and left medial segment 510 are formed as one continuous element. Similarly, right lateral segment 530 and right medial segment 520 are also formed as one continuous element. Lower left segment 540 is a single independent member as well as the lower right segment 550. In this embodiment, the lower left segment 540 is directly fixed (i.e. does not slide) to a location on the continuous member formed by segments 500 and 510. Similarly, the lower right segment 550 is directly fixed to a location on the continuous member formed by segments 520 and 530.

Figure 9:
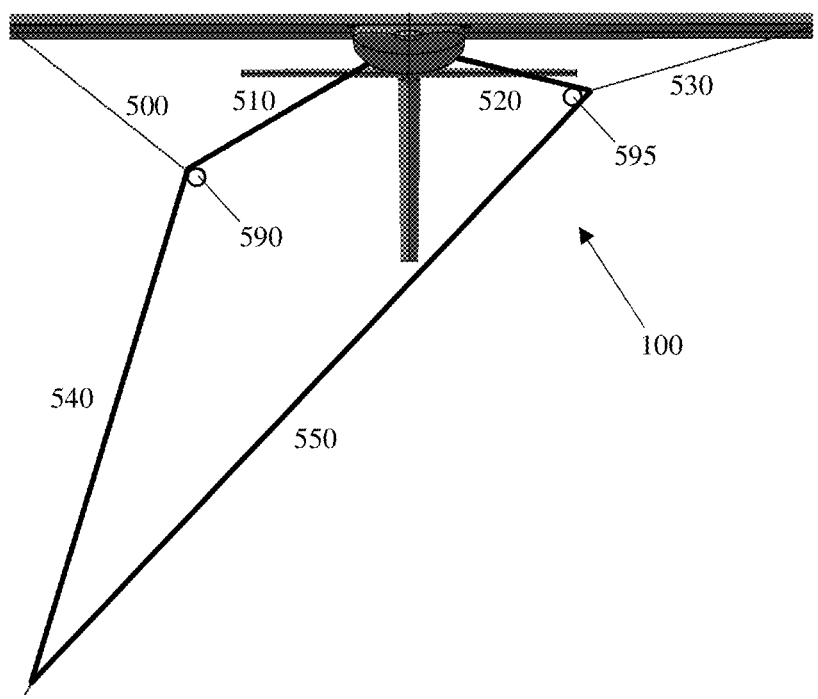
FIG. 9 is a detailed view of DETAIL A and illustrating another embodiment for arranging the bridle system.

FIG. 9 is a detailed view of DETAIL A illustrating another embodiment for arranging the bridle system. In this embodiment, the upper left medial segment 510, lower left segment 540, lower right segment 550, and upper right medial segment 520 form one continuous element.

The upper left medial segment 510 forms a first end of this continuous member and is preferably attached to the sheave 300 at one end and attached directly to the lower left member 540 at the opposing end. The lower left member 540 has a first end attached to the upper left medial segment 510 and an opposing end attached to the lower right segment 550. The lower right segment 550 has a first end attached to the lower left segment 540 and an opposing end attached to the upper right medial segment 520. At the second end of this continuous member is the upper right medial segment 520 having a first end attached to the lower right segment 550 and an opposing end attached to the sheave 300.

Upper left lateral segment 500 is preferably a single independent member with a first end attached to the wing 110 and a second end attached to a pulley 590 which slides along a portion of the continuous member defined by the left medial 510 and lower left 540 bridle segments. Similarly, upper right lateral segment 530 is preferably a single independent member with a first end attached to the wing 110 and a second end attached to a pulley 595 which slides along a portion of the continuous member defined by the right medial 520 and lower right 550 bridle segments.

Figure 10:
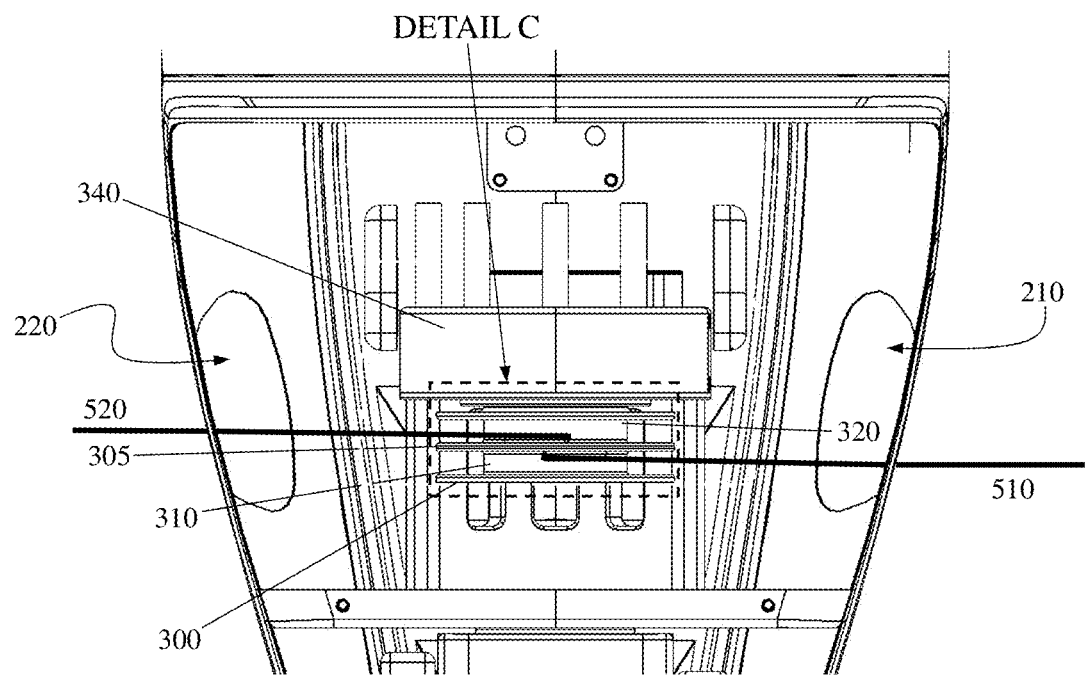
FIG. 10 is a top plan view of a portion of the forward fuselage with the top cover removed to show one embodiment for arranging the interior components, and showing the location of DETAIL C.

FIG. 10 is a top plan view of the forward fuselage 130 with the top cover removed to show one embodiment for arranging the interior components. It is preferable that the medial bridle segments 510 and 520 are separated by a rim 305 placed between their respective grooves 310 and 320.

Figure 11:
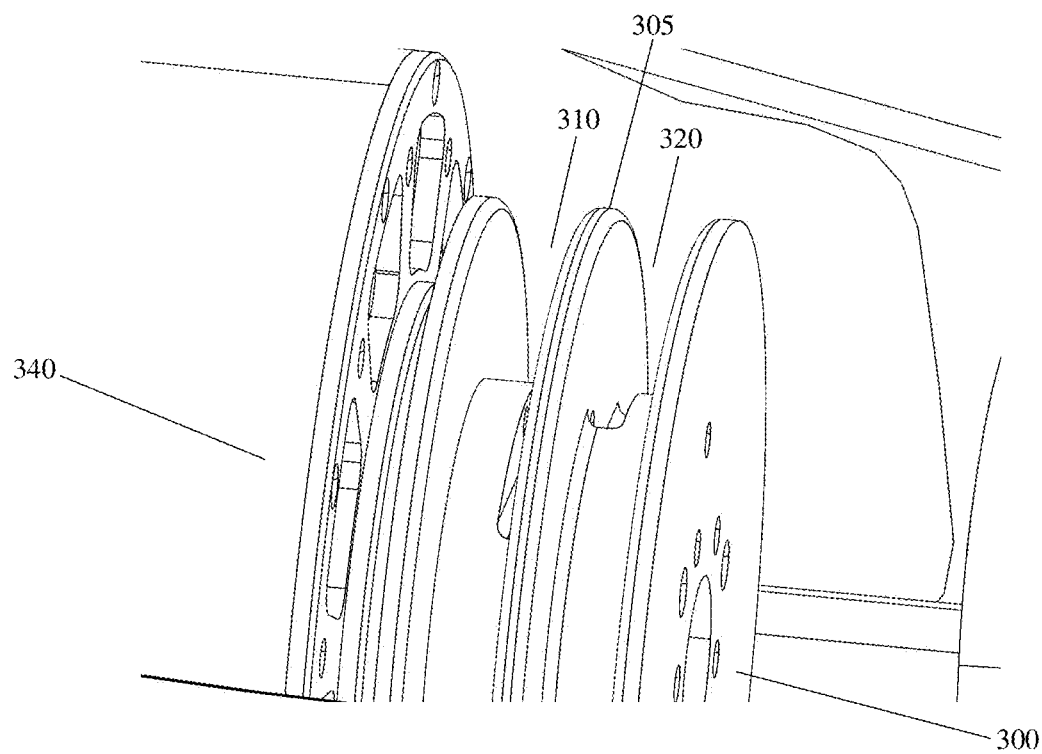
FIG. 11 is a perspective partial view of an exemplary embodiment of the roll control sheave.

FIG. 11 is a perspective partial view of an exemplary embodiment of the roll control sheave 300. Each of the bridle segments described herein are preferably comprised of wire rope which is generally a number of individual metal (or fiber) elongate strands that are wrapped together. Some embodiments of the bridle segments may have a fiber core with a plurality of metal cables wrapped around the fiber core. Each bridle segment will preferably end with some type of wire rope termination device, including but not limited to sockets, wire rope splices, or wire rope clips in order to connect the bridle segment with the wing 110, a pulley, or other adjacent bridle segments as shown and described herein.

Figure 12:
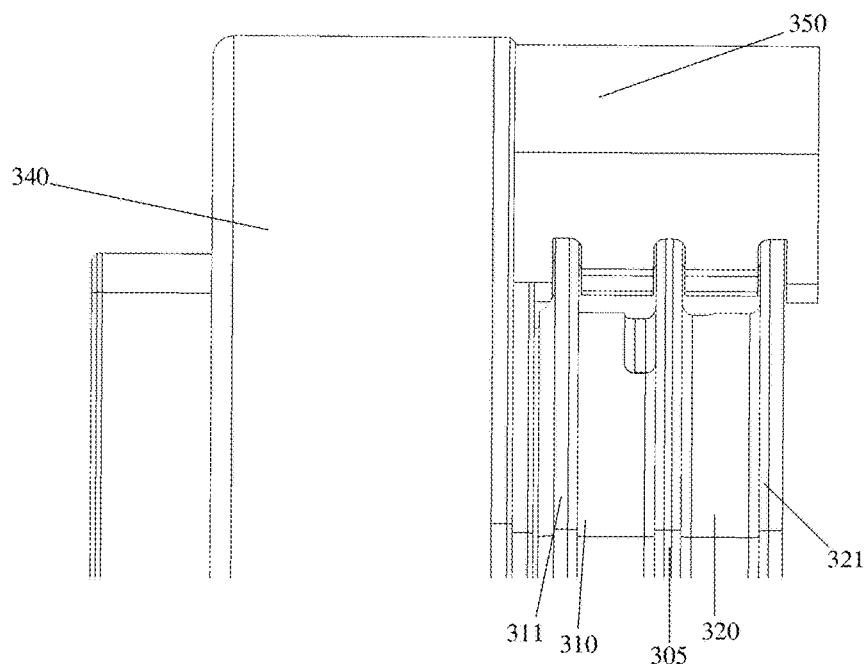
FIG. 12 is a partial side projection view of exemplary interior components of the fuselage.

FIG. 12 is a partial side projection view of one example of the interior components of the fuselage 130. Preferably the cover 350 is placed in close proximity to the rims 311, 305, and 321 which define the grooves 310 and 320 for the bridles. In this embodiment, the cover 350 extends from the motor 340 to cover the sheave 300.

Figure 13:
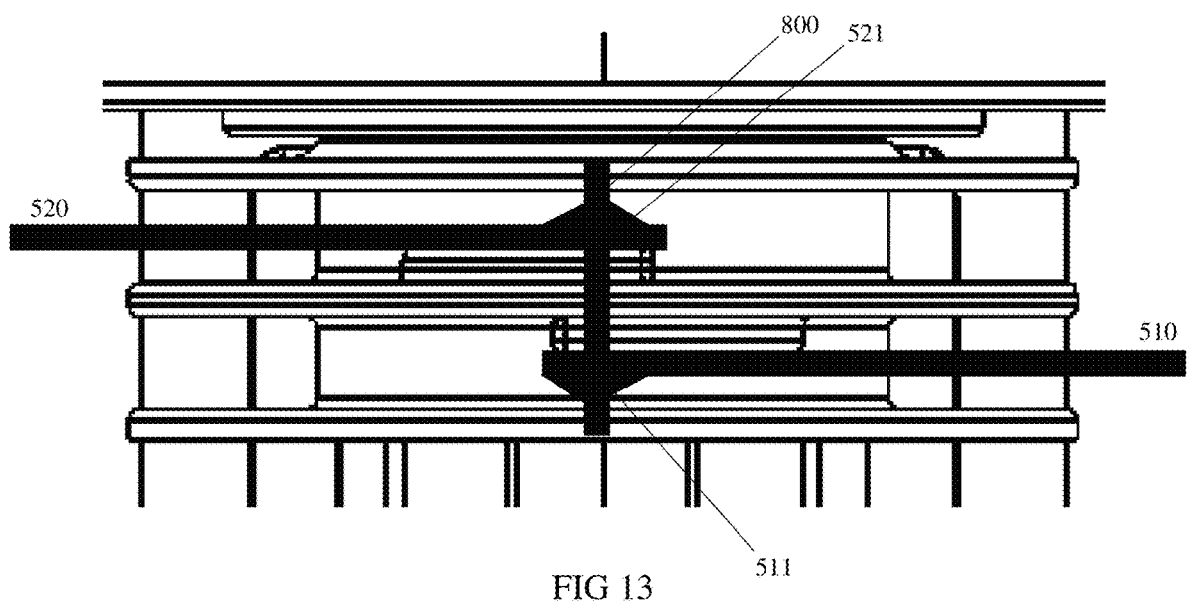
FIG. 13 is a detailed view of DETAIL C.

FIG. 13 is a detailed view of DETAIL C. Those skilled in the art will appreciate that the medial bridle segments 520 and 510 can attach to the sheave 300 in a number of ways without departing from the scope of the disclosed invention. In a preferred embodiment, however, each bridle segment 510 and 520 includes a wire rope termination device 511 and 520 respectively which would connect with one or more pins 800 that pass through one or more of the rims 311, 305, 321. It is preferable that when the airborne unit 100 is positioned horizontally in a balanced position (i.e., no significant roll of the wing 110 to either side) each medial bridle segment 520 and 510 should wrap approximately one time around the sheave 300. However, some embodiments may wrap each bridle less than once, more than one time around the sheave 300 or a combination thereof, and would still function. The preferred horizontal configuration may be altered depending on the needs of a particular application in some cases.

Figure 14:
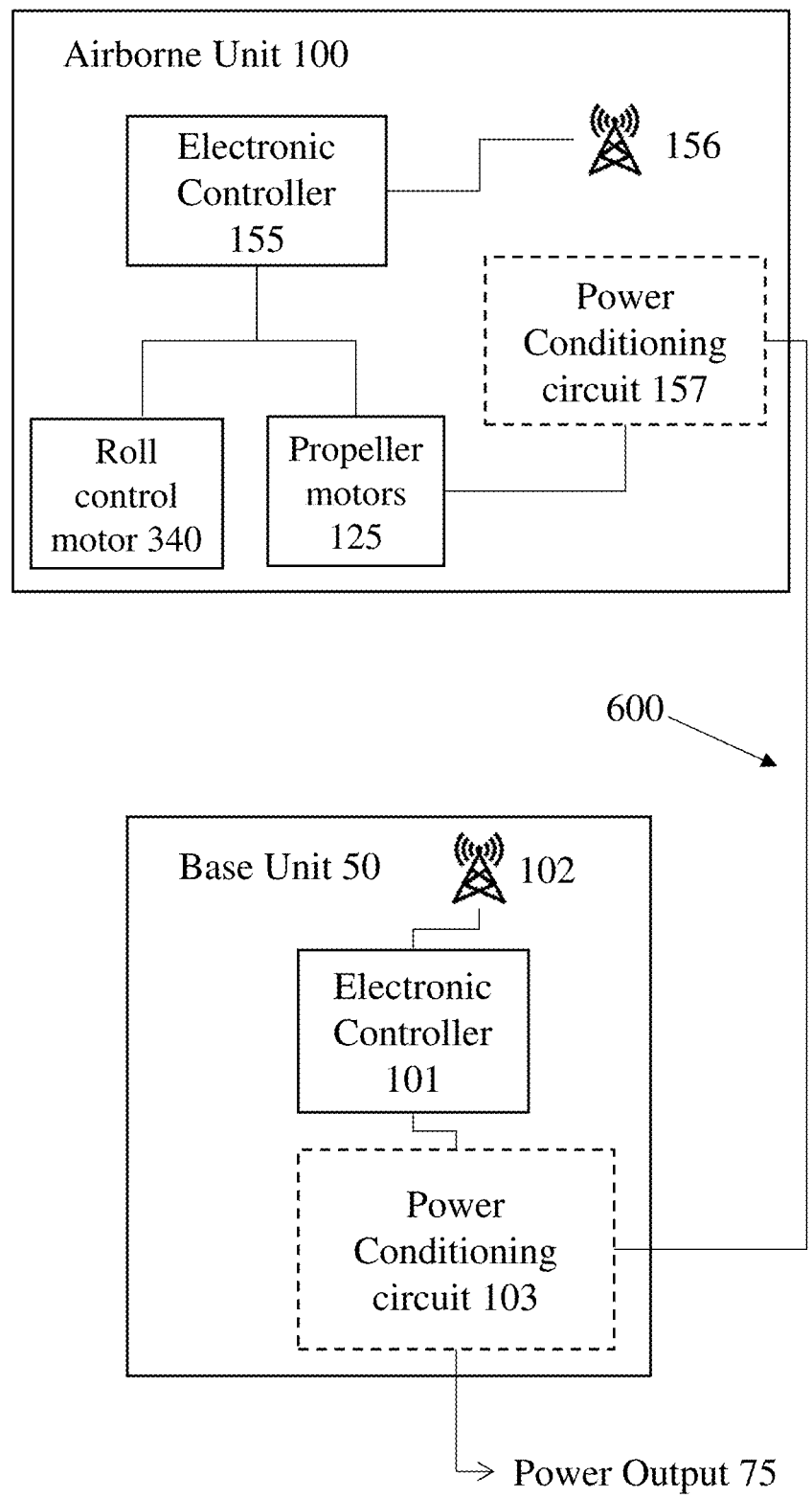
FIG. 14 is a simplified electrical block diagram of exemplary embodiments of the base unit and airborne unit.

FIG. 14 is a simplified electrical block diagram of exemplary embodiments of the base unit 50 and airborne unit 100. Here, the base unit 50 preferably contains an electronic controller 101 in electronic communication with a wireless transmitter/receiver 102 as well an optional power conditioning circuit 103 which receives power from the electrified tether 600. After generating the power, it can be transmitted to the power output 75.

The airborne unit 100 preferably contains an electronic controller 155 which is in electrical communication with the roll control motor 340, propeller motors 125, as well as a wireless transmitter/receiver 156 which is adapted to communicate with the transmitter/receiver 102 on the base 50. The propeller motors 125 are also preferably connected to an optional power conditioning circuit 157 which may clean, step up/down, or convert/invert power prior to send it down the electrified tether 600 to the base unit 50. When the system requires the airborne unit 100 to roll, the electronic controller 155 would direct the roll control motor 340 to rotate the sheave 300 to a desired position corresponding to a desired roll angle. This desired roll angle system signal may be transmitted from the base unit's transmitter/receiver 102 or may be determined at the controller 155 in the airborne unit 100.

Figure 15:
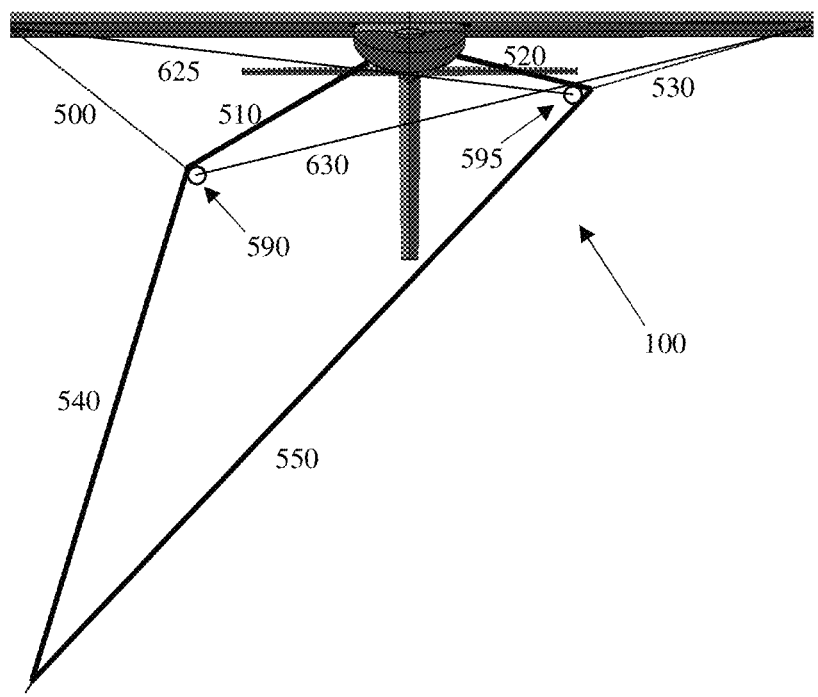
FIG. 15 is a detailed view of DETAIL A and illustrating another embodiment for arranging the bridle system.

FIG. 15 is a detailed view of DETAIL A and illustrating another embodiment for arranging the bridle system. In this embodiment, similar to the embodiment shown in FIG. 9 above, the upper left medial segment 510, lower left segment 540, lower right segment 550, and upper right medial segment 520 preferably form one continuous element. In this embodiment, these elements and their description above remain largely the same. However, this embodiment includes two additional bridle segments.

The first additional segment is the left lateral support segment 625 which is preferably a single independent member with a first end attached to the wing 110 (near the attachment point of upper left lateral segment 500) and a second end attached to a pulley 590 which slides along a portion of the continuous member defined by the left medial 510 and lower left 540 bridle segments. The second additional segment in this embodiment is a right lateral support segment 630 which is preferably a single independent member with a first end attached to the wing 110 (near the attachment point of upper right lateral segment 530) and a second end attached to a pulley 595 which slides along a portion of the continuous member defined by the right medial 520 and lower right 550 bridle segments.

Figure 16:
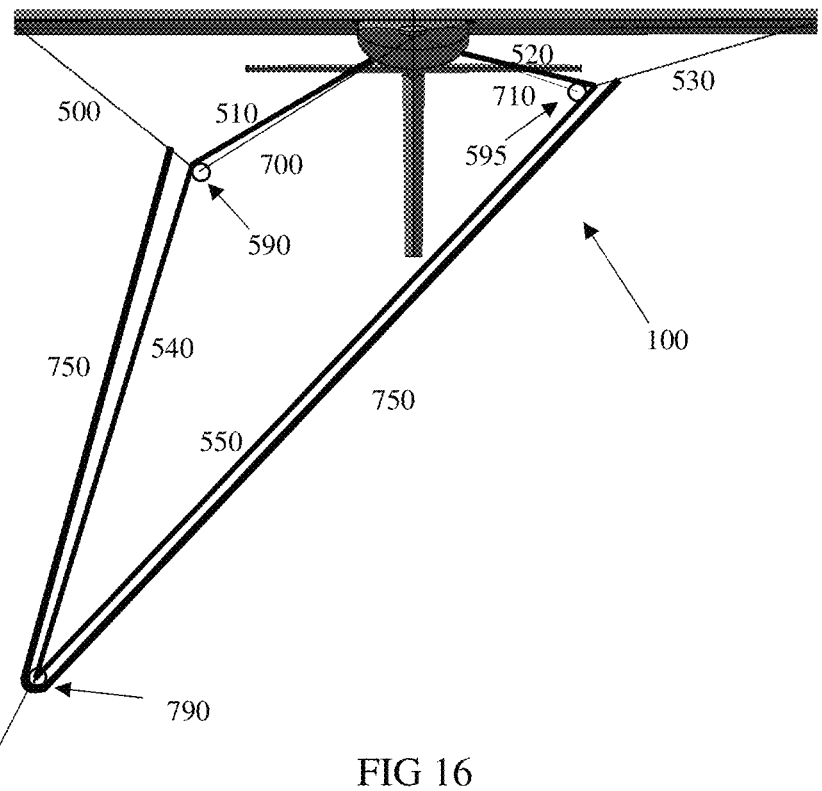
FIG. 16 is a detailed view of DETAIL A and illustrating another embodiment for arranging the bridle system.

FIG. 16 is a detailed view of DETAIL A and illustrating another embodiment for arranging the bridle system. In this embodiment, similar to the embodiment shown in FIG. 9 above, the upper left medial segment 510, lower left segment 540, lower right segment 550, and upper right medial segment 520 preferably form one continuous element. In this embodiment, these elements and their description above remain largely the same. However, this embodiment includes additional bridle segments with an additional pulley.

The first additional segment is the left medial support segment 700 which is preferably a single independent member with a first end attached to the wing 110 (near the center of the wing 110 and preferably near the sheave 300) and a second end attached to a pulley 590 which slides along a portion of the continuous member defined by the left medial 510 and lower left 540 bridle segments. The second additional segment in this embodiment is a right medial support segment 710 which is preferably a single independent member with a first end attached to the wing 110 (near the center of the wing 110 and preferably near the sheave 300) and a second end attached to a pulley 595 which slides along a portion of the continuous member defined by the right medial 520 and lower right 550 bridle segments.

This embodiment also includes a third additional segment as the lower support segment 750 which is preferably a continuous member which is attached at a first end to the upper left lateral segment 500, wraps around an additional pulley 790, and continues to a second end which is attached to the upper right lateral support segment 530.

As used herein, the term "electronic controller" is used to represent electronic components and a software controller capable of executing software instructions for performing any of the features described herein. In some cases the electronic controller would be a microcontroller, a microprocessor, or CPU/RAM combination.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claim.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a", "an", and "the" refer to both the singular as well as plural, unless the context clearly indicates otherwise. The term "comprising" as used herein is synonymous with "including", "containing" or "characterized by" and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" describe and account for small fluctuations, such as due to variations in processing or operational ranges that are evident from the disclosure to those skilled in the art, for instance. For example, these terms can refer to less than or equal to ±5%, such as less than or equal to ±2%, such as less than or equal to ±1%, such as less than or equal to =0.5%, such as less than or equal to ±0.2%, such as less than or equal to ±0.1%, such as less than or equal to ±0.05%, or 0%.

Underlined or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. An airborne wind energy system connected to a power output comprising:
    an airborne unit comprising:
        a wing bearing at least one rotor motor configured to generate electrical power and having a left end and right end;
        a fuselage attached to the wing between the left and right ends of the wing;
        a roll control motor secured within the fuselage; and
        a roll control sheave connected to and rotatably driven by the roll control motor;
    an electrified tether electrically connecting the airborne unit with the power output; and
    a bridle system having a first segment and a second segment connected to the roll control sheave wherein the rotation of the roll control sheave lengthens one of the first and second segments and shortens the other, thereby inducing the airborne unit to roll.

2. The airborne wind energy system of claim 1, wherein the bridle system comprises:
    a left lateral segment with a distal end and a proximal end fixed to the wing between the left end of the wing and the fuselage;
    a right lateral segment with a distal end and a proximal end fixed to the wing between the right end of the wing and the fuselage;
    a left medial segment with a proximal end fixed to the roll control sheave and a distal end fixed to the distal end of the left lateral segment;

a right medial segment with a proximal end fixed to the roll control sheave and a distal end fixed to the distal end of the right lateral segment;
a lower left segment with a proximal end fixed to a tether connection and a distal end fixed to the distal end of the left lateral segment and the distal end of the left medial segment; and
a lower right segment with a proximal end fixed to the tether connection and distal end fixed to the distal end of the right lateral segment and the distal end of the right medial segment.

3. The airborne wind energy system of claim 2, wherein the rotation of the roll control sheave in a first direction shortens the left medial segment and lengthens the right medial segment, and the rotation of the roll control sheave in a second direction lengthens the left medial segment and shortens the right medial segment.

4. The airborne wind energy system of claim 2, further comprising a support tether fixed between the ground and an tether attachment point.

5. The airborne wind energy system of claim 2, wherein each of the segments of the bridle system are comprised of wire rope.

6. The airborne wind energy system of claim 5, wherein the proximal end of the left medial segment is a wire rope termination device connected to the roll control sheave with a pin and wrapped around the roll control sheave one time, and wherein the proximal end of the right medial segment is a wire rope termination device connected to the roll control sheave with a pin and wrapped around the roll control sheave one time.

7. The airborne wind energy system of claim 2, wherein the roll control sheave further comprises a first groove and a second groove separated by a rim.

8. The airborne wind energy system of claim 7, wherein the proximal end of the left medial segment is connected to the roll control sheave within the first groove in the roll control sheave, and the proximal end of the right medial segment is connected to the roll control sheave within the second groove in the roll control sheave.

9. The airborne wind energy system of claim 8, further comprising a sheave cover extending from the roll control motor to cover a portion of the first and second grooves in the roll control sheave.

10. The airborne wind energy system of claim 2, further comprising a sheave cover extending from the roll control motor to cover a portion of the first and second grooves in the roll control sheave.

11. The airborne wind energy system of claim 1, wherein the bridle system comprises:
a first continuous segment connected at a proximal end to the roll control sheave and a distal end fixed to the wing between the left end of the wing and the fuselage;
a lower left segment with a proximal end fixed to a tether connection and a distal end fixed to the first continuous segment between the proximal and distal ends;
a second continuous segment connected at a proximal end to the roll control sheave and a distal end fixed to the wing between the right end of the wing and the fuselage; and
a lower right segment with a proximal end fixed to the tether connection and distal end fixed to the second continuous segment between the proximal and distal ends.

12. The airborne wind energy system of claim 1, wherein the bridle system comprises:
a continuous segment comprising:
a first end fixed to the roll control sheave;
a second end fixed to the roll control sheave; and
a tether attachment point between the first and second ends;
a left lateral segment with a proximal end fixed to the wing between the left end of the wing and the fuselage and a distal end movably attached to the continuous segment with a first pulley between the first end and the tether attachment point; and
a right lateral segment with a proximal end fixed to the wing between the right end of the wing and the fuselage and a distal end movably attached to the continuous segment with a second pulley between the second end and the tether attachment point.

13. The airborne wind energy system of claim 12, wherein the bridle system further comprises:
a left lateral support segment with a proximal end fixed to the wing between the left end of the wing and the fuselage and a distal end connected to the second pulley; and
a right lateral support segment with a proximal end fixed to the wing between the right end of the wing and the fuselage and a distal end connected to the first pulley.

14. The airborne wind energy system of claim 12, wherein the bridle system further comprises:
a third pulley located at the tether attachment point;
a left medial support segment with a proximal end fixed to the wing near the fuselage and a distal end fixed to the first pulley;
a right medial support segment with a proximal end fixed to the wing near the fuselage and a distal end fixed to the second pulley; and
a lower support segment fixed at a first end to the left lateral segment and at a second end to the right lateral segment and is carried on the third pulley therebetween.

15. An airborne wind energy system:
an airborne unit comprising:
a wing bearing at least one rotor motor configured to generate electrical power and having a left end and right end;
a fuselage attached to the wing between the left and right ends of the wing;
a roll control motor secured within the fuselage; and
a roll control sheave connected to and rotatably driven by the roll control motor;
a base unit comprising a power output;
an electrified tether electrically connecting the airborne unit with the power output; and
a bridle system comprising:
a left lateral segment with a distal end and a proximal end fixed to the wing between the left end of the wing and the fuselage;
a right lateral segment with a distal end and a proximal end fixed to the wing between the right end of the wing and the fuselage;
a left medial segment with a proximal end fixed to the roll control sheave and a distal end fixed to the distal end of the left lateral segment;
a right medial segment with a proximal end fixed to the roll control sheave and a distal end fixed to the distal end of the right lateral segment;
a lower left segment with a proximal end fixed to a tether connection and a distal end fixed to the distal end of the left lateral segment and the distal end of the left medial segment; and a lower right segment with a proximal end fixed to the tether connection and distal end fixed to the distal end of the right lateral segment and the distal end of the right medial segment.

16. The airborne wind energy system of claim 15, wherein the bridle system comprises:
   a first continuous segment connected at a proximal end to the roll control sheave and a distal end fixed to the wing between the left end of the wing and the fuselage;
   a lower left segment with a proximal end fixed to a tether connection and a distal end fixed to the first continuous segment between the proximal and distal ends;
   a second continuous segment connected at a proximal end to the roll control sheave and a distal end fixed to the wing between the right end of the wing and the fuselage; and
   a lower right segment with a proximal end fixed to the tether connection and distal end fixed to the second continuous segment between the proximal and distal ends.

17. The airborne wind energy system of claim 15, wherein the bridle system comprises:
   a continuous segment comprising:
      a first end fixed to the roll control sheave;
      a second end fixed to the roll control sheave; and
      a tether attachment point between the first and second ends;
   a left lateral segment with a proximal end fixed to the wing between the left end of the wing and the fuselage and a distal end movably attached to the continuous segment with a first pulley between the first end and the tether attachment point; and
   a right lateral segment with a proximal end fixed to the wing between the right end of the wing and the fuselage and a distal end movably attached to the continuous segment with a second pulley between the second end and the tether attachment point.

18. The airborne wind energy system of claim 17, wherein the bridle system further comprises:
   a left lateral support segment with a proximal end fixed to the wing between the left end of the wing and the fuselage and a distal end connected to the second pulley; and
   a right lateral support segment with a proximal end fixed to the wing between the right end of the wing and the fuselage and a distal end connected to the first pulley.

19. The airborne wind energy system of claim 17, wherein the bridle system further comprises:
   a third pulley located at the tether attachment point;
   a left medial support segment with a proximal end fixed to the wing near the fuselage and a distal end fixed to the first pulley;
   a right medial support segment with a proximal end fixed to the wing near the fuselage and a distal end fixed to the second pulley; and
   a lower support segment fixed at a first end to the left lateral segment and at a second end to the right lateral segment and is carried on the third pulley therebetween.

* * * * *